(12) United States Patent
Bertero et al.

(10) Patent No.: US 6,482,505 B1
(45) Date of Patent: *Nov. 19, 2002

(54) MULTI-LAYER TEXTURE LAYER (75) Inventors: Gerardo Bertero, Redwood City; Javier Wong, San Francisco; Tu Chen, Monte Sereno, all of CA (US)

(73) Assignee: Komag, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,345

(22) Filed: May 11, 2000

(51) Int. Cl.[7] ................ G11B 5/82; G11B 5/66
(52) U.S. Cl. .............. 428/212; 428/433; 428/612; 428/667; 428/680; 428/694 ST; 428/694 SG
(58) Field of Search ................ 428/212, 612, 428/667, 680, 694 ST, 694 SG, 900, 433

(56) References Cited

U.S. PATENT DOCUMENTS

| | | | |
|---|---|---|---|
| 5,250,339 A | 10/1993 | Tani et al. | 428/64 |
| 5,626,920 A | 5/1997 | Weir et al. | 427/530 |
| 5,681,635 A | 10/1997 | Nelson et al. | 428/65.3 |
| 5,741,560 A | 4/1998 | Ross | 427/555 |
| 5,855,951 A | 1/1999 | Nelson et al. | 427/129 |
| 5,980,997 A | 11/1999 | Ross et al. | 427/555 |
| 6,117,499 A | * 9/2000 | Wong et al. | 427/599 |
| 6,143,375 A | * 11/2000 | Ross et al. | 427/555 |
| 6,316,097 B1 | * 11/2001 | Liu et al. | 428/332 |

OTHER PUBLICATIONS

Rosenblum et al., "Laser Textured Magnetic Disk Comprising NiNb", U.S. application No. 08/905,292, filed Aug. 1, 1997.

* cited by examiner

Primary Examiner—Stevan A. Resan (57) ABSTRACT

A method for improving corrosion resistance while maximizing magnetic performance of a magnetic disk employed in data storage applications. The invention includes providing a substrate and forming a first layer above the substrate, the first layer having a first degree of abrasion resistance. The invention includes forming a second layer such as a Ni-containing layer above the first layer, the Ni-containing layer having a second degree of abrasion resistance lower than the first degree of abrasion resistance. The invention further includes forming grooves in the Ni-containing layer.

46 Claims, 10 Drawing Sheets

MULTI-LAYER TEXTURE LAYER

BACKGROUND OF THE INVENTION

The present invention relates to techniques for manufacturing magnetic disks employed in data storage applications, to disks formed as described herein, and disk drives incorporating such disks. More particularly, the present invention relates to magnetic disks and manufacturing techniques therefor which improve corrosion resistance and magnetic performance.

Figure 1:
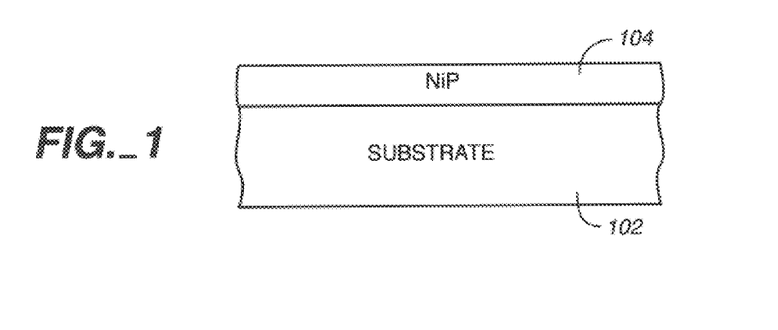
FIG. 1 shows an exemplary substrate, including the substrate bulk and an overlying NiP layer.

The use of a substrate such as glass, or aluminum covered with plated nickel phosphorus (NiP), as a base to manufacture magnetic disks for data storage is well known. For purposes of discussion, FIG. 1 shows an exemplary aluminum alloy substrate 102. Above substrate 102, there is disposed a layer of nickel phosphorus 104, typically formed by a deposition process such as electroless plating. Typically, the NiP layer is plated to a thickness of several microns. This thickness is required because a substantial amount is subsequently polished off to create a smooth surface. The polishing is relatively extensive because the as-deposited surface of the NiP layer is rough, which in turn is due to the relatively rough surface of the aluminum substrate. A high thickness of NiP is also required to provide a hard surface compared to that of the soft aluminum substrate, to reduce the damage caused by sudden head impact ("dinging") during operation of the disk drive.

There are typically additional layers disposed above NiP layer 104, such as an underlayer typically comprising chromium (Cr) (as used herein, Cr or a layer of Cr shall be understood to include Cr alloys), an overlayer of magnetic material (such as a cobalt alloy or iron alloy) disposed above the Cr underlayer, and a protective overcoat.

By way of background, the NiP layer is typically textured to provide a preferential degree of orientation of magnetic moments in the overlying magnetic layer. Generally, the NiP layer is textured by forming texture grooves in the downtrack direction. As the term is employed herein, the downtrack direction shall be understood to be generally orthogonal or near orthogonal to the radial direction of the disk and may include concentric, crosshatch, or at times non-parallel patterns. The texture grooves cause a preferential alignment of magnetic moments along the downtrack direction in the cobalt alloy layer.

As is well known to those skilled in the art, this preferential alignment of magnetic moments allows for increased coercivity and hysteresis squareness in the downtrack direction which makes it possible to reliably store bits of data at high density in the magnetic layer as compared with an isotropic layer. The high squareness is important because it results in a higher magnetic remanence (Mr) in the downtrack direction. As is known, the signal strength is proportional to Mr times the thickness (T) of the magnetic layer, or MrT. While it is desirable to have a high MrT for the signal, it is also imperative to reduce the effective space loss between the read/write element and the magnetic layer to 1 microinch ($\mu"$) or lower. The effective space loss is the distance between approximately the center of the magnetic layer and the read and write element. Thus, there has been a continuing trend towards reduced magnetic layer thickness, T. With the higher Mr provided by preferential orientation therefore, a lower thickness magnetic layer can be employed while still maintaining sufficient MrT. In addition to reducing the thickness of the magnetic layer, other methods to reduce the space loss include reducing the thickness of the protective overcoat layer, and reducing the head-media spacing during read and write operations.

Returning to the texture process, in the current art, the NiP layer is typically textured using a mechanical abrasion process. In one case, the mechanical abrasion process essentially abrades the NiP layer along the downtrack direction using a tape having thereon abrasive particles. Unfortunately, it has been found that the mechanical abrasion process tends to gouge the NiP layer forming some grooves that are excessively deep. Additionally, high ridges are formed along the gouged groove.

Figure 2:
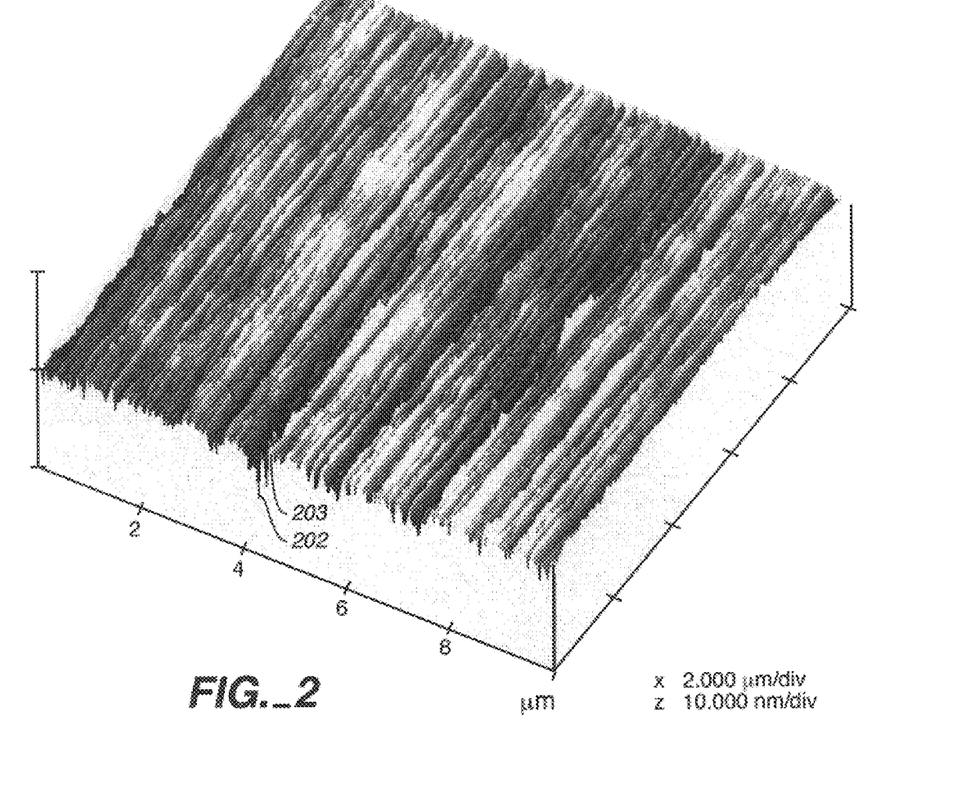
FIG. 2 shows an AFM scan of a textured NiP layer, having deep gouges and high ridges formed therein.

FIG. 2 is an atomic force microscope (AFM) scan of a textured NiP layer. It will be appreciated that the horizontal and vertical scales of FIG. 2 are not the same as one another. As can be seen, some grooves, such as groove 202, are excessively deep and narrow, while others are of approximately the desired depth for inducing the preferred magnetic orientation. In addition, along deep groove 202 is ridge 203, which is higher than desired. Although the non-uniformity among groves can be minimized by using abrasive slurries having a more uniform distribution of particles and by controlling the abrasion process more precisely, the very mechanical nature of the mechanical abrasion process renders it impossible to eliminate the nonuniformity completely.

Figure 3A:
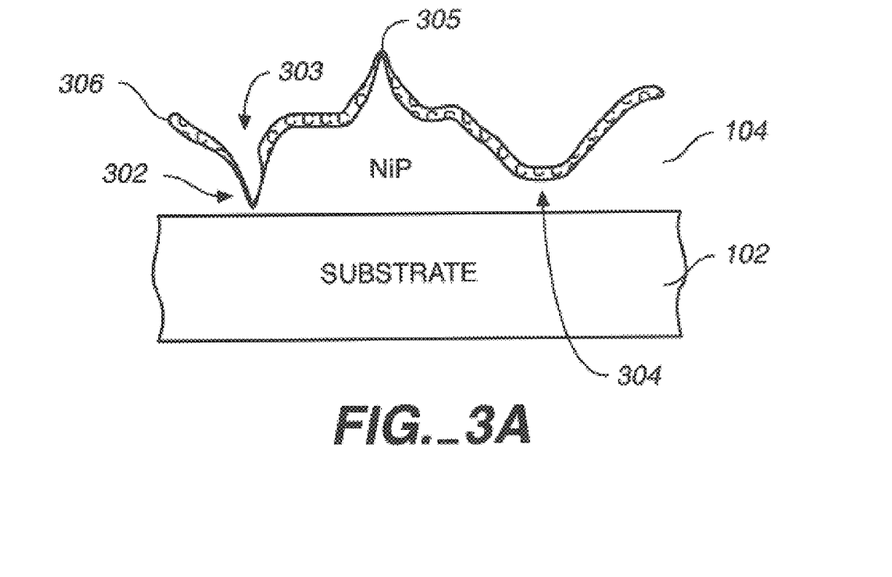
FIG. 3A shows the corrosion susceptibility that may occur due to deep gouges and high ridges on the substrate surface.

FIG. 3A illustrates a problem that occurs with deep gouges. It will be appreciated that the drawings of the grooves such as that shown in FIG. 3A are not necessarily to scale. In FIG. 3A, layer 306 represents the overcoat layer. It will be appreciated that there are other layers, not shown in FIG. 3A, underlying layer 306. Such layers may include, for example, one or more underlayers, one or more magnetic layers, one or more overcoat layers, and one or more additional layers that may be deposited by e.g. sputter deposition. The overcoat layer 306 typically comprises a carbon-containing layer. As layer 306 is deposited, the depth and profile of deep groove 302 makes it difficult for layer 306 to adequately cover the NiP surface. As a result, voids or gaps in layer 306 may be present near the vicinity of deep groove 302. The layers underlying layer 306 may or may not have voids in deep grooves, depending on their thickness and other factors. As a result of the gaps, one or more of the various layers under layer 306, and/or the NiP layer and/or the substrate are now exposed to moisture, which causes corrosion. The Co alloy layer is particularly susceptible to corrosion, and is the primary cause of concern. Additionally, the other layers, and the substrate material are also susceptible to corrosion to varying degrees. In any event, corrosion will lead to the generation of particles that are picked up by the head resulting in degraded drive performance In contrast to groove 302 of FIG. 3A, groove 304 is of about the desired profile, and layer 306 can cover the entire surface in the region of groove 304. Because layer 306 is a good moisture barrier, corrosion is prevented because moisture can not penetrate to the layers underneath layer 306. The formation of gaps in layer 306 becomes more likely as the thickness of layer 306 is reduced, so that the problem depicted in FIG. 3A can be expected to get worse in future products.

As mentioned above, a further problem that may occur during texturing is the formation of ridges, such as ridge 305 in FIG. 3A, along the gouged grooves. While the deposition coverage of the various layers over high points is generally good, there may be a failure to cover extremely sharp points, particularly by the thin protective overcoat layer, so that underlying layers are exposed and therefore susceptible to corrosion. An additional concern arises with respect to ridges sufficiently high to collide with magnetoresistive heads, giant magnetoresistive heads and the like, because such collisions cause a temperature rise of the magnetoresistive element, which generates a false signal. This failure mechanism is referred to as thermal asperity. Because of this, as one of the later stages of manufacture, after all layers have been deposited, a burnish step is performed which effectively knocks off any high points. When the asperity is knocked off during burnish, a portion of layer 306 is knocked off as well. This problem is also particularly severe with overcoat layers having a low thickness. In any event, because of this one or more layers, such as the Co alloy layer, will be exposed, leading to corrosion at that site.

Figure 3B:
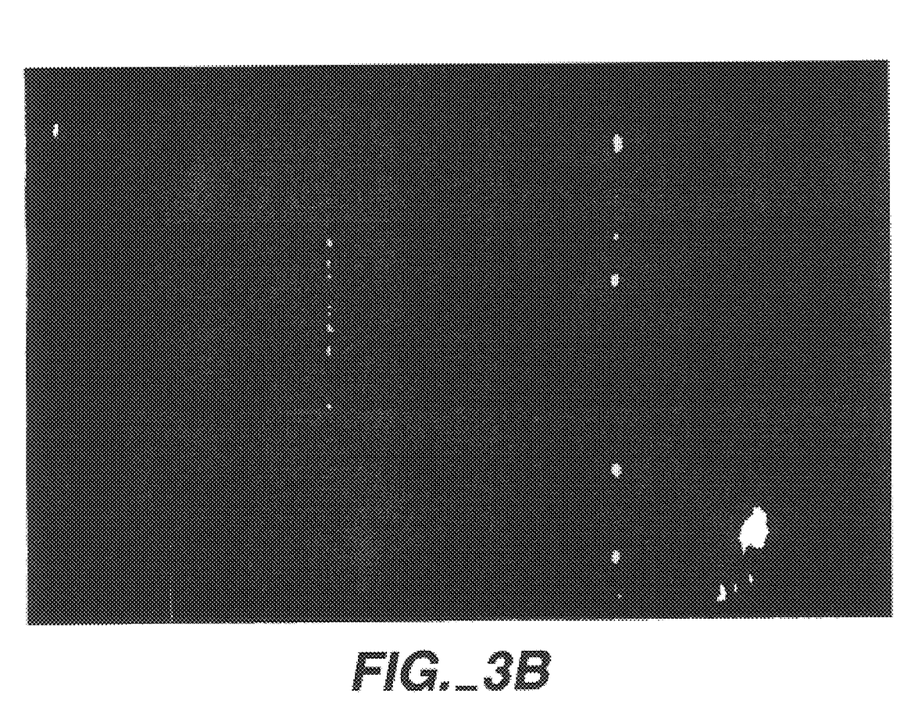
FIG. 3B shows corrosion sites that may occur on a substrate surface such as that illustrated in FIG. 3A.

To determine corrosion susceptibility, a disk is subjected to either a high temperature, high humidity environment, or is subjected to a hydrochloric acid (HCl) test. The disk is then examined under a dark field optical microscope. FIG. 3B shows a photomicrograph of corrosion sites on a disk, which appear as light areas or spots on a dark background. As can be seen, many of the corrosion sites occur along a line. This is due to the above-described ridges or gouges in some of the texture lines.

Glass substrates pose particular challenges. It is difficult to texture glass substrates because of their hardness and because texturing can cause microscopic fractures along the texture lines. Moreover, it has been found that textured glass does not induce a preferred orientation in the manner that a textured NiP layer does. Because glass is non-metallic, it cannot be plated with a NiP layer in a conventional manner. A NiP layer can be deposited by vacuum techniques, such as described in U.S. Pat. No. 5,250,339. However, it is asserted therein that such films must be sufficiently thick to prevent the NiP film from peeling off and to provide a uniform surface. Although the '339 patent describes a lower limit of 0.03 micron for the NiP layer, it can be seen from the data therein that a uniform surface finish is not obtained until a NiP thickness of approximately 0.1 micron.

Additionally, because glass is a poor thermal conductor, the thermal asperity problem is exacerbated. Moreover, as fly heights are reduced, occasional contact between the media and the head occurs. This causes a local rise in the media temperature, which, if not uniformly dissipated, causes a baseline shift in the signal. Because of the foregoing, it is known to be desirable to put a thermally conductive layer, such as a vacuum deposited metal layer, or thick electroless NiP layer (after first forming an underlayer to enable plating on the glass substrate) below the various media layers. Depending upon the thermal conductivity of the material, such layer typically must be about 0.1 micron or greater. In addition, the layer must be sufficiently thick to eliminate any possibility of the texturing process reaching the glass substrate, as the slurry will scratch the substrate surface, generating defects. One problem with thick NiP layers is the formation of deep gouges and high ridges as described herein. Another problem with increased layer thickness is that the internal stress increases, so that delamination of the layer may occur. A further problem with high thickness layers formed by vacuum deposition is the relatively high cost.

U.S. Pat. Nos. 5,681,635 and 5,855,951 propose use of a hard film on glass ceramic substrate. The films described therein are selected on the basis of their ability to form a pseudo-diffusion region and a graded interfacial region between the layer and the glass ceramic substrate. Specifically, the deposited materials interact with the ceramic substrate material to form a compressive stress, which increases the substrate's strength. On this layer, a softer, texturable layer is deposited. The exemplary material described is a titanium nitride (TiN) layer as the hard underlayer followed by a softer titanium (Ti) rich TiN layer. Unfortunately, the layers described in these patents are not practical for several reasons. First, some of the materials described are crystalline in nature. Such materials form crystal facets at sufficiently great thicknesses, which increases the surface roughness. For example, the Ra roughness of an exemplary film is stated to be less than one microinch ($\mu$"). The required Ra roughness of current and future disks is well below one $\mu$" such that surfaces with a roughness in this range are unacceptable. In addition, the materials described in the foregoing patents are not well known or characterized in disk drive applications, particularly the suggested Ti rich TiN texture layer, in which it may be very difficult to create a desirable texture structure. The thicknesses of 0.5–5.0 microns ($\mu$m) for the lower layer and 100–150 nanometers (nm) (i.e. 0.1–0.15 $\mu$m) for the texture layer are relatively high, resulting in increased costs.

In view of the foregoing, there are desired improved techniques and structures for improving magnetic performance in a magnetic media that employs grooves formed in the downtrack direction in a texture layer such as a NiP layer. Preferably, such media should have one or more of the following characteristics: It should be compatible with the requirements of very low fly height (contact or near contact) recording. As the head flies closer to the surface of the disk, the glide requirements will be more stringent, resulting in a greater number of corrosion sites unless high points are substantially reduced prior to burnish. Moreover, media should also be able to tolerate the continually decreasing overcoat thicknesses needed to meet the demands of future high density media. Any void in the overcoat layer results in a corrosion site, and this problem can be expected to get worse as overcoat layers get thinner. Currently, the state of the art demands overcoat thickness as low as approximately 50 Å, with lower thicknesses to be employed in the future as the areal density continues to increase.

Further, any layer used for texturing should preferably work at a relatively low thickness, particularly if it is to be used with glass substrates. This is important because glass presents a smooth surface, which is needed for low fly height, and a very hard surface, which is resistant to defects such as embedded particles. A low thickness texture layer essentially preserves the advantages of the glass layer. A further preferable feature, particularly with glass, is that the material should have good thermal conductivity to dissipate heat, to mitigate the effects of local temperature rise resulting from occasional head-media contact during read operations. It is also desirable for the layer to have good electrical conductivity as well, so that a bias can be applied during sputtering on non-conductive substrates. The layer should also have good adhesion to a glass substrate to prevent delamination or to avoid a costly additional adhesion layer. In addition, as vacuum deposition is an expensive step, low layer thickness is desirable to achieve lower costs. Moreover, any metallization process and structure for glass, glass ceramic and similar substrates should be relatively simple and low cost, because these substrates are typically considerably more expensive than conventional aluminum substrates.

It is also preferable that the texture layer be amorphous, as crystalline layers tend to form with facets, increasing the roughness of the surface. It is also preferable that the texture layer comprise a well characterized and understood material such as nickel phosphorus (NiP), so that the design of the media can proceed with the advantage of these known characteristics, including its effect on the magnetic properties of the media. The material of the layer should itself exhibit good corrosion resistance. In this regard, an amorphous structure is further desirable because amorphous layers generally have superior corrosion resistance (even as compared to the same material in crystalline form) because of the lack of grain boundaries that usually accelerate corrosion.

SUMMARY OF THE INVENTION

The invention relates, in one embodiment, to a method for improving corrosion resistance while maximizing magnetic performance of a magnetic disk employed in hard disk drive applications. The invention includes providing a substrate and forming a first layer above the substrate, the first layer having a first degree of abrasion resistance. The invention includes forming a second layer above the first layer, the second layer having a second degree of abrasion resistance lower than the first degree of abrasion resistance. The invention further includes forming downtrack grooves in the second layer.

In another embodiment, the invention relates to a magnetic disk for data storage, which includes a substrate, and a first layer disposed above the substrate, the first layer having a first degree of abrasion resistance. The magnetic disk further includes a second layer disposed above the first layer, the second layer having a second degree of abrasion resistance, the first degree of abrasion resistance being higher than the second degree of abrasion resistance, the second layer having thereon downtrack grooves.

In yet another embodiment, the invention relates to a magnetic disk drive for storing data, which includes a magnetic disk including a substrate, a first layer disposed above the substrate, the first layer having a first degree of abrasion resistance, and a second layer disposed above the first layer, the second layer having a second degree of abrasion resistance, the first degree of abrasion resistance being higher than the second degree of abrasion resistance, the second layer having thereon downtrack grooves, and a magnetic layer disposed above the second layer. The magnetic disk drive further includes a motor coupled to the magnetic disk for rotating the magnetic disk, and a read-write head configured to be disposed in a spaced-apart relationship with the magnetic layer for reading data from and writing data to the magnetic disk. Additionally, there is included an arm for holding the read-write head in proximity to the magnetic disk, and an actuator for moving the arm so that the read-write head may be placed over desired positions on the magnetic disk.

Embodiments of the present invention preferably have one or more advantageous features including use of an amorphous layer for the first layer, use of nickel niobium (NiNb) for the first layer, use of an amorphous, nonmagnetic nickel-containing layer, such as NiP, for the second layer, low as-formed surface roughness of the first and second layer, and relatively low thickness of the second layer and of both layers combined.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details, such as specific substrate materials, layer materials, thicknesses and the like are set forth in order to provide a thorough understanding of the present invention. It will be apparent, however, to one skilled in the art, that the present invention may be practiced without some or all of these specific details. In other instances, well known process steps and/or structures have not been described in detail in order not to obscure unnecessarily the present invention.

The invention relates, in one embodiment, to apparatus and methods for improving magnetic performance in a magnetic media that employs grooves formed in the downtrack direction in a texture layer. In one embodiment, the texture layer is a Ni-containing layer. For the purpose of discussion, a NiP layer is described as the texture layer. In one embodiment, a layer is disposed beneath the NiP layer. This lower layer has a higher degree of hardness or abrasion resistance to the mechanical abrasion process than the NiP layer. The lower layer is preferably as hard as or harder than the substrate so that the texture process does not penetrate to the substrate and to provide improved shock resistance. During mechanical abrasion, the lower layer prevents the formation of deep grooves in the substrate surface even if the NiP layer is abraded through. By providing this layer, the NiP can be textured without gouging or asperity, and with the desired roughness (Ra) and peak to valley height of the grooves.

In one embodiment, the lower layer is preferably formed of an amorphous or substantially amorphous layer so that crystal facets are not created. In other words, an amorphous layer is typically relatively smooth, which is needed in low fly height drives. The use of an amorphous layer also prevents unwanted or unintentional biasing of the lattice structure of the overlying layers. In a preferred embodiment, the lower layer is a nickel niobium (NiNb) layer. However, it is contemplated that other materials or alloys having a suitable degree of hardness and/or abrasion resistance (i.e., harder and/or more abrasion resistance than the NiP layer and preferably about as hard as or harder than the substrate material) may also be employed. Preferably, the material employed also has a relative high degree of heat conductivity, to prevent or mitigate the problems of thermal asperity and baseline shift described in the background section, and a reasonably high electrical conductivity, to allow for substrate biasing during sputtering.

By way of example, a material such as titanium nitride (TiN), tungsten carbide (WC), or the like may be employed for the lower layer. If such layers are used, they are preferably deposited in amorphous form, or to a sufficiently low thickness such that large crystal facets are not formed. In particular, materials that readily form hard, amorphous films such as niobium alloys and tantalum alloys are preferred in the practice of the present invention. Moreover, the lower layer should have good adhesion to the substrate. In addition, in some embodiments, it is desirable that there be a distinct interface between the lower layer and texture layer, rather than a gradual change, so that texturing reliably and repeatedly stops at the interface. NiNb has been found to be particularly advantageous as it has good adhesion to glass containing substrates, high thermal conductivity, high electrical conductivity, excellent abrasion resistance, is amorphous, and can be deposited with a very smooth surface. In addition, the layer itself is highly corrosion resistant.

Figure 9:
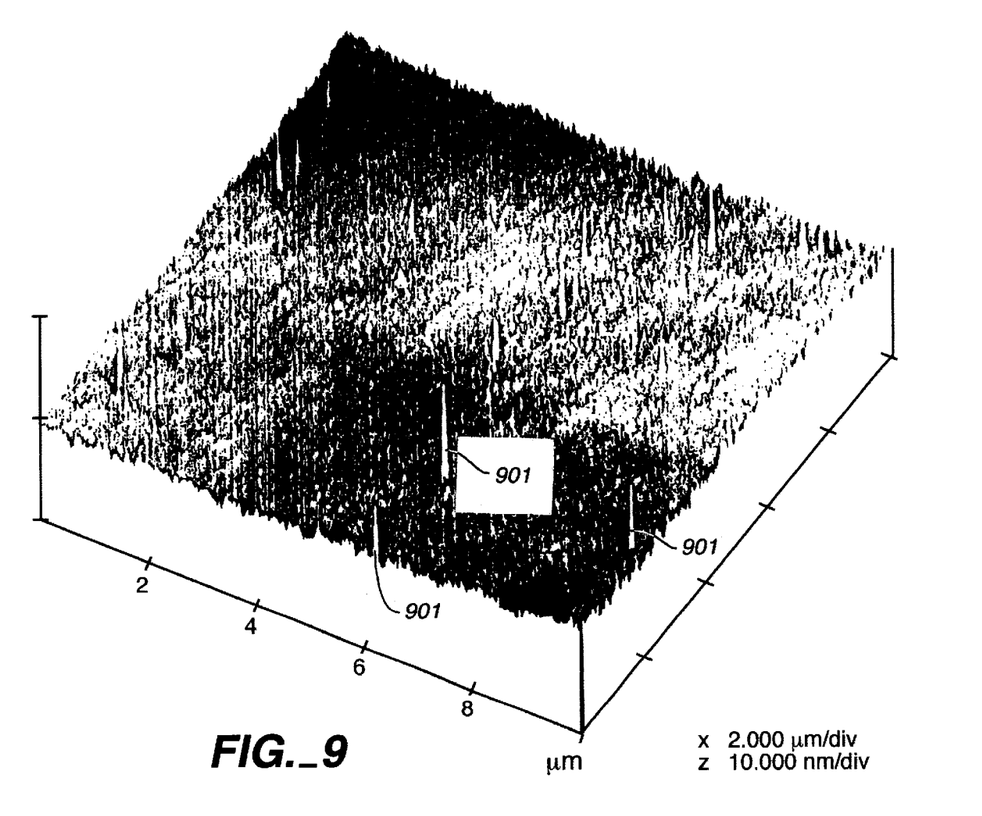
FIG. 9 shows an untextured glass substrate surface after deposition of a first and a second layer.

The invention may be practiced on any suitable substrate, particularly substrates made of materials such as glass, high density carbon, titanium, and the like. Glass substrates may be made by a variety of methods, such as floating, drawing, fusion or pressing processes. Typically, the glass is a silicate glass, e.g. aluminosilicate or borosilicate, but other types of glasses without additives or with different or additional additives, can be used as well. Glass ceramic materials comprise some crystalline material. As used herein, a glass substrate shall mean any substrate comprising glass, such as an amorphous glass substrate or a glass ceramic substrate. With substrates having beneficial properties, such as glass substrates, the invention enables fully utilizing the benefits of the substrate properties. For example, for glass, the extremely smooth (i.e. low roughness) surface quality of glass is preserved, as are other benefits of glass, such as lower susceptibility to embedded particles as compared with conventional aluminum substrates. This is particularly true with the relatively low thicknesses of the deposited lower layer and texture layer that may be used in the present invention as described herein. Moreover, because the lower layer is resistant to abrasion, it prevents the problem of substrate scratches and consequent defects. A further problem that may occur with glass without an underlayer is the formation of small "micro" spikes (see FIG. 9) due to reaction of materials in the glass with commonly used cleaning agents, or with ambient moisture. Embodiments of the present invention reduce or eliminate these problems.

Figure 4:
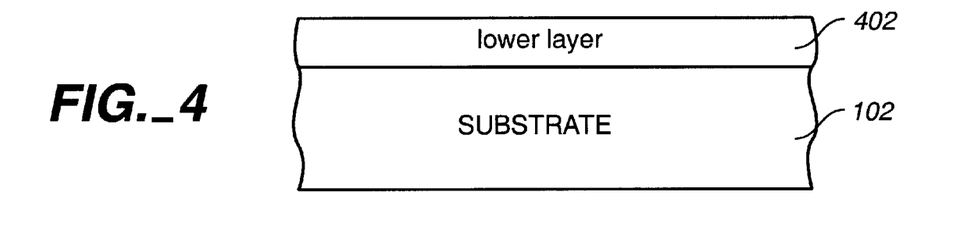
FIG. 4 shows, in accordance with one embodiment of the present invention, a substrate that includes a hard, amorphous layer for the purpose of preventing texture gouge and ridge formation, and providing good thermal conductivity, while facilitating high magnetic performance.

To facilitate discussion, FIG. 4 illustrates in a simplified format a portion of a magnetic media disk that includes substrate 102. Above substrate 102, there is disposed a lower layer 402. As the terms are employed herein, a layer that is "above" or "over" another layer (or words of similar import) means such layer is disposed above another layer, irrespective of whether there is any intermediate layer in between. Similarly, a layer that is "below" or "underneath" another layer (or words of similar import) means such layer is disposed below another layer, irrespective of whether there is any intermediate layer in between. As mentioned earlier, lower layer 402 is preferably formed of a material that has a sufficient degree of abrasion resistance to the mechanical abrasion process employed to form the downtrack grooves in the NiP layer such that if the NiP layer is abraded through, the rate of abrasion in the lower layer is lower than the rate of abrasion in the NiP layer. In the case of FIG. 4, the lower layer is a nickel niobium layer. The nickel niobium layer is about 20–70% nickel and about 30–80% niobium. In some embodiments, the nickel niobium layer is about 40–60% Ni and 60–40% Nb. In addition, the layer may contain other additives as well. As used herein, reference to nickel phosphorus (or NiP) or nickel niobium (or NiNb) shall include any material having nickel and phosphorus or having nickel and niobium, respectively, regardless of the exact composition or presence of other additives.

Additionally, lower layer 402 is preferably an amorphous layer that can be deposited with a resulting smooth surface. Preferably, the surface roughness (Ra) of lower layer 402 as deposited, is less than about 50 Å, more preferably less than about 25 Å, and most preferably less than about 10 Å. In some embodiments, the as-deposited Ra of the surface is approximately 5 Å or less. In other words, the lower layer should not add any additional roughness to the smooth surface of the substrate, so that the roughness of the layer surface is virtually a copy of the Ra of the substrate. Ra roughness as used herein means the arithmetic average peak to valley roughness measured with a scan length of 10 $\mu$m. The Ra roughness may be measured using an atomic force microscope (AFM).

Figure 5:
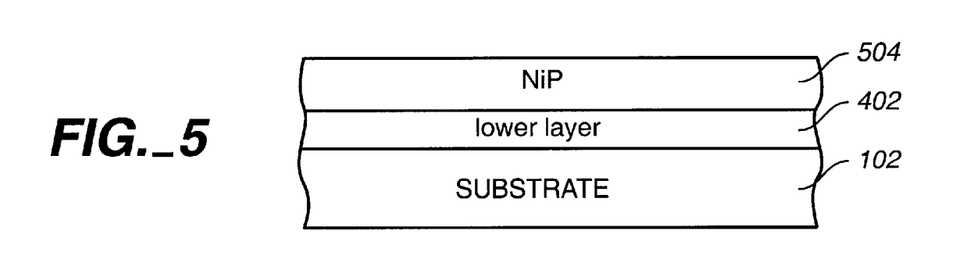
FIG. 5 shows, in accordance with one embodiment of the present invention, the substrate of FIG. 4 including an overlying amorphous Ni-containing layer for texturing.

In FIG. 5, a texture layer 504, comprising in a preferred embodiment an NiP layer, is formed above the lower layer 402. This texture layer 504, as well as lower layer 402, may be deposited using any suitable deposition process. Preferred methods include sputtering, chemical vapor deposition, evaporation and ion beam deposition, but other methods may be used. Sputtering is particularly preferred because it is relatively simple, well known, cost effective, and utilizes equipment for which there is presently an installed base. Therefore, in a preferred embodiment, lower layer 402 is formed by sputter deposition followed by in-situ sputter deposition of texture layer 504. The texture layer 504 is also preferably also relatively thin and/or amorphous and therefore also presents a surface roughness as-deposited in the ranges listed above for the lower layer 402.

Figure 6A:
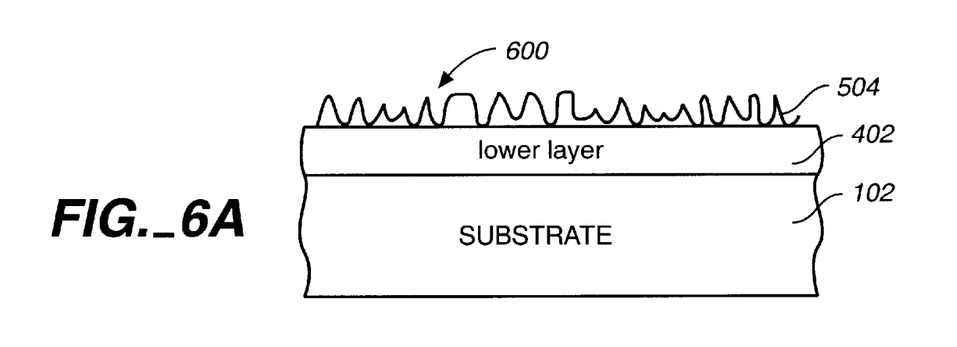
FIG. 6A shows, in accordance with one embodiment of the present invention, the magnetic disk of FIG. 5 after downtrack grooves have been formed in the Ni-containing layer by a mechanical abrasion process.
Figure 6B:
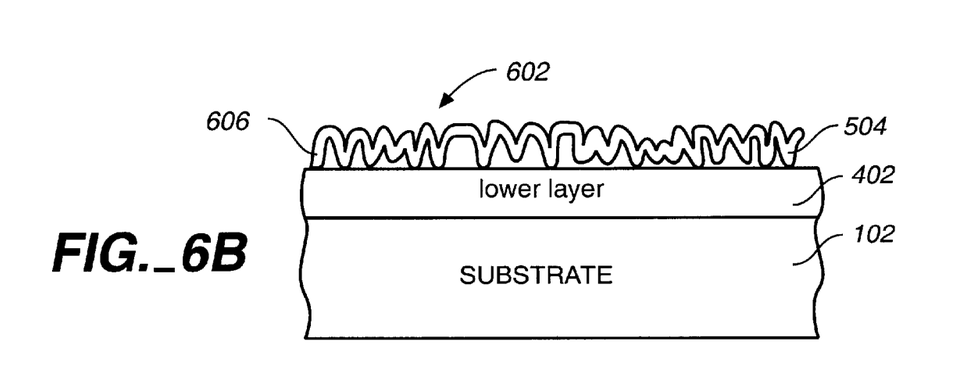
FIG. 6B shows the coverage of the protective overcoat, after deposition on the magnetic disk of FIG. 6A.

FIG. 6A depicts the magnetic disk of FIG. 5 after downtrack grooves have been formed in the NiP layer 504 by a mechanical abrasion process. As can be seen in FIG. 6A, the presence of the lower layer 402 prevents the formation of unduly deep grooves or excessively high ridges after some of the NiP layer 504 is abraded through. Accordingly, the grooves are substantially more uniform relative to the situation of FIG. 2. In this manner, the subsequently-deposited layers may be as thin as desired for magnetic characteristics without forming an excessive number of corrosion sites due to e.g. voids in the protective layer caused by gouging or by burnish removal of asperities. FIG. 6B illustrates the coverage of a thin protective overcoat layer 606 over NiP layer 504. As can be seen, overcoat layer 606 uniformly covers the surface without voids or gaps. It will be appreciated that other layers (not shown) are present between NiP layer 504 and overcoat layer 606.

This uniformity-enhancing effect of the lower layer is particularly important as the storage density increases and layer thicknesses and the grooves become smaller. In particular, the magnetic layers likely will decrease in thickness to reduce the effective space loss, as described in the background section. The chromium alloy layer, which as known has very good corrosion resistance properties also is likely to continue the trend to lower thickness. Similarly, the protective overcoat layer is expected to continue its decrease in thickness to reduce the effective space loss to achieve a sufficiently strong signal. With these layers becoming thinner, the problem of coverage over the grooves becomes more critical, and the benefits of the present invention can be expected to play an increasingly important role. Moreover, with the reduced overcoat thickness and near contact recording, the absence of asperities and the presence of uniform grooves will help prevent read errors due to thermal asperity and baseline shift. In addition, uniform grooves will allow the overcoat layer to cover the surface more completely so that it is less susceptible to wear and particle generation. Thus, in addition to the magnetic properties associated with downtrack grooves, grooves formed by the present invention, regardless of their direction, provide for improved tribological performance.

As described in the background section, it is known that downtrack grooves provide a preferential orientation of magnetic properties. It has been discovered that the grooves allow the subsequently formed chromium film (such as chromium molybdenum (CrMo) and chromium vanadium (CrV)) to have a relatively low degree of compressive stress in the radial direction relative to the compressive stress in the downtrack direction of the disk. In other words, stress relaxation occurs in the radial direction in the chromium layer. This causes a distortion in the lattice structure of the layer's crystals, and biases the subsequently formed cobalt alloy layer to orient the easy axis of magnetization preferentially in the downtrack direction, resulting in a preferential alignment of magnetic moments in the downtrack direction. The uniform texturing of the present invention allows for small, uniform grains of Cr to be formed, which results in reduced media noise. Additionally, the uniformity allows for consistent magnetic performance, including improved thermal stability.

In general, it is desired to create a process wherein the deposited NiP layer is sufficiently thick to allow for formation of grooves of sufficient average height to achieve the desired orientation ratio. Stated alternatively, in some embodiments it is desirable that there is approximately just that amount needed for the desired size of the grooves, such as, e.g. 25–150 Å, and the texture process forms the grooves without significant bulk removal. In contrast, in the prior art of NiP on aluminum, it was necessary for the texture process to remove a significant thickness of the NiP because the polish process left defects such as scratches that needed to be removed by the texture process. In alternative embodiments, the thickness of the upper layer is slightly greater than the average peak to valley height of the grooves so that the texture process removes some amount of the bulk thickness of the layer. This ensures sufficient thickness for the desired degree of texturing, and allows for a reasonable extent of texturing of the NiP layer to occur just prior to reaching the lower layer. In any event, the layer thickness is generally kept to the minimum needed for process and magnetic performance, to help preserve the smooth surface condition of the substrate, to decrease material costs and to increase throughput. Additionally, by putting on approximately just that thickness necessary to form grooves of a desired size, the process is more controllable, and deep gouges and high ridges are prevented.

In addition, the texturing process is designed so that the texturing stops when, on average, the depth of the grooves reaches about the level of the lower layer. Even though the lower layer would prevent excessively deep gouging to prevent the presence of pin holes and prevent corrosion, allowing the texturing process to continue too long will have a leveling effect on the grooves, which degrades the orientation ratio, which in turn reduces magnetic performance. Thus, there is an optimum point where excellent corrosion prevention is attained, and very good magnetic performance is achieved.

While the process may be designed to stop approximately when the grooves, on average, just meet the lower layer, in some embodiments the texturing process may be designed to stop above this point on average to prevent excessive smoothing (i.e., to prevent degradation of the orientation ratio), while still providing a lower limit to the depths of the grooves.

Table 1 illustrates the effect of texturing on corrosion for one exemplary process. The media used to produce table one included a glass substrate having a lower NiNb layer of approximately 1000 Å deposited thereon, followed by a NiP layer of approximately 200 Å. Thereafter, different disks were textured as shown in the table, followed by conventional cleaning steps and deposition of a CrMo underlayer, one or more Co alloy magnetic layers and a carbon overcoat layer.

TABLE 1

| Texture Extent | HCl Pinhole Density (#/mm$^2$) |
| --- | --- |
| No Texture | 21 |
| 4 pulses slurry dispense | 126 |
| 8 pulses slurry dispense | 75 |
| 12 pulses slurry dispense | 0 |
| 18 pulses slurry dispense | 0 |
| 24 pulses slurry dispense | 0 |
| 30 pulses slurry dispense | 0 |

In Table 1, the texture extent is given as the number of pulses of slurry dispenses. Each pulse occurs about 3 seconds apart and dispenses a certain amount of slurry (e.g. one or a few drops. Thus, a greater number of pulses corresponds to longer texture process and therefore greater NiP removal. As can be seen in Table 1, the pinhole density is at 21/mm$^2$ without any texturing. This is due to random irregularities on the surface of the substrate (see FIG. 9). The defects arise due to the burnish process "chopping off" these irregularities and leaving exposed layers susceptible to corrosion, as described earlier. Preliminary texturing (4 pulses) increases the corrosion susceptibility (to 126/mm$^2$). This is because with only minimal texturing, there are high ridges because insufficient texturing has occurred to level them and there are deep gouges because the texturing is still well above the lower layer. Additional texturing steadily decreases corrosion susceptibility (as can be seen with the 8 pulses case). Thereafter, additional texturing causes corrosion susceptibility to further decrease. As can be seen, corrosion sites are substantially eliminated at 12 pulses or more.

Figure 7A:
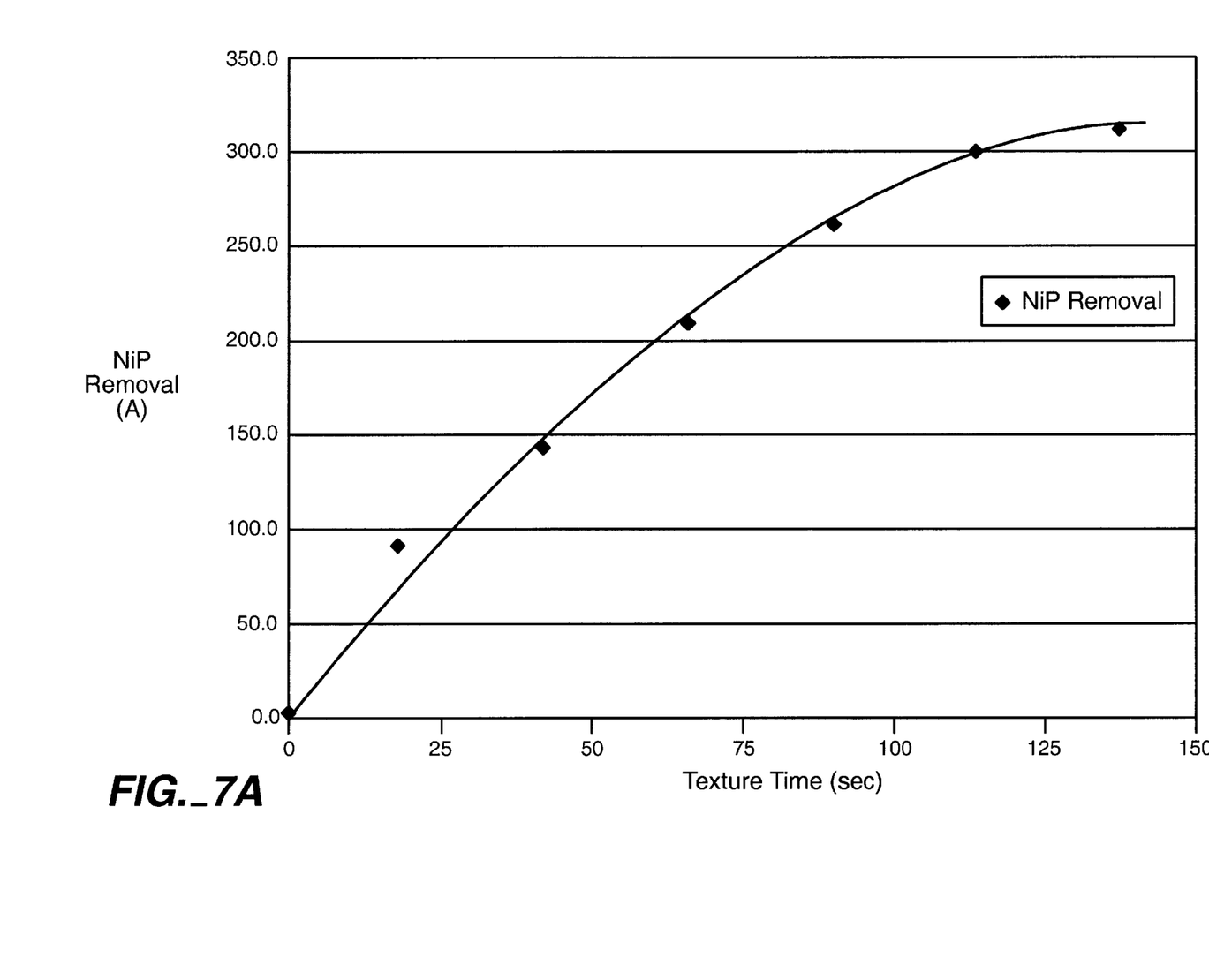
FIGS. 7A, 7B and 7C show NiP removal as a function of texture time, MrT orientation ratio as a function of NiP removal, and number of corrosion sites as a function of NiP removal, respectively, for a process according to an embodiment of the present invention, for a first initial NiP layer thickness.
Figure 7B:
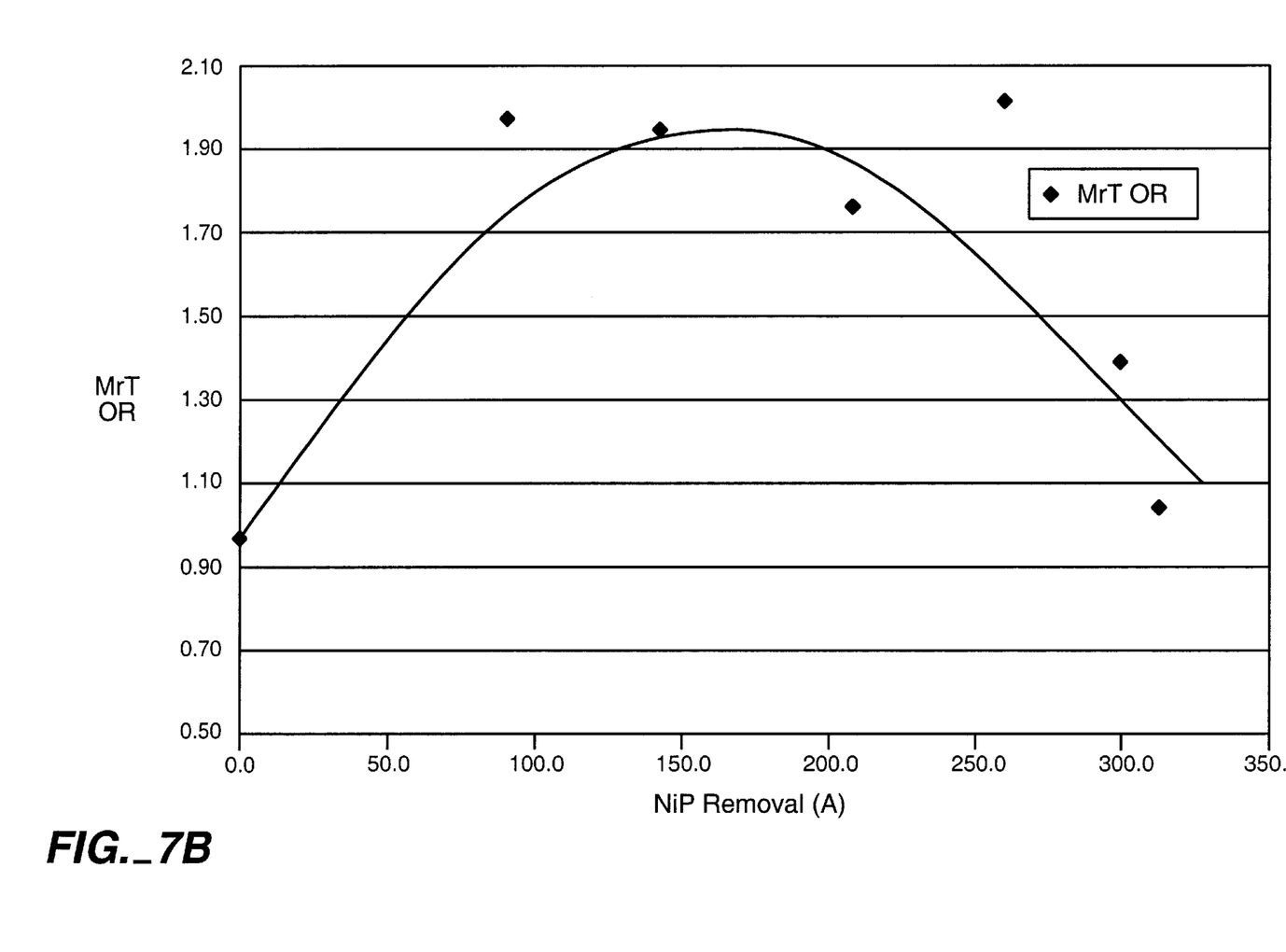
Figure 7C:
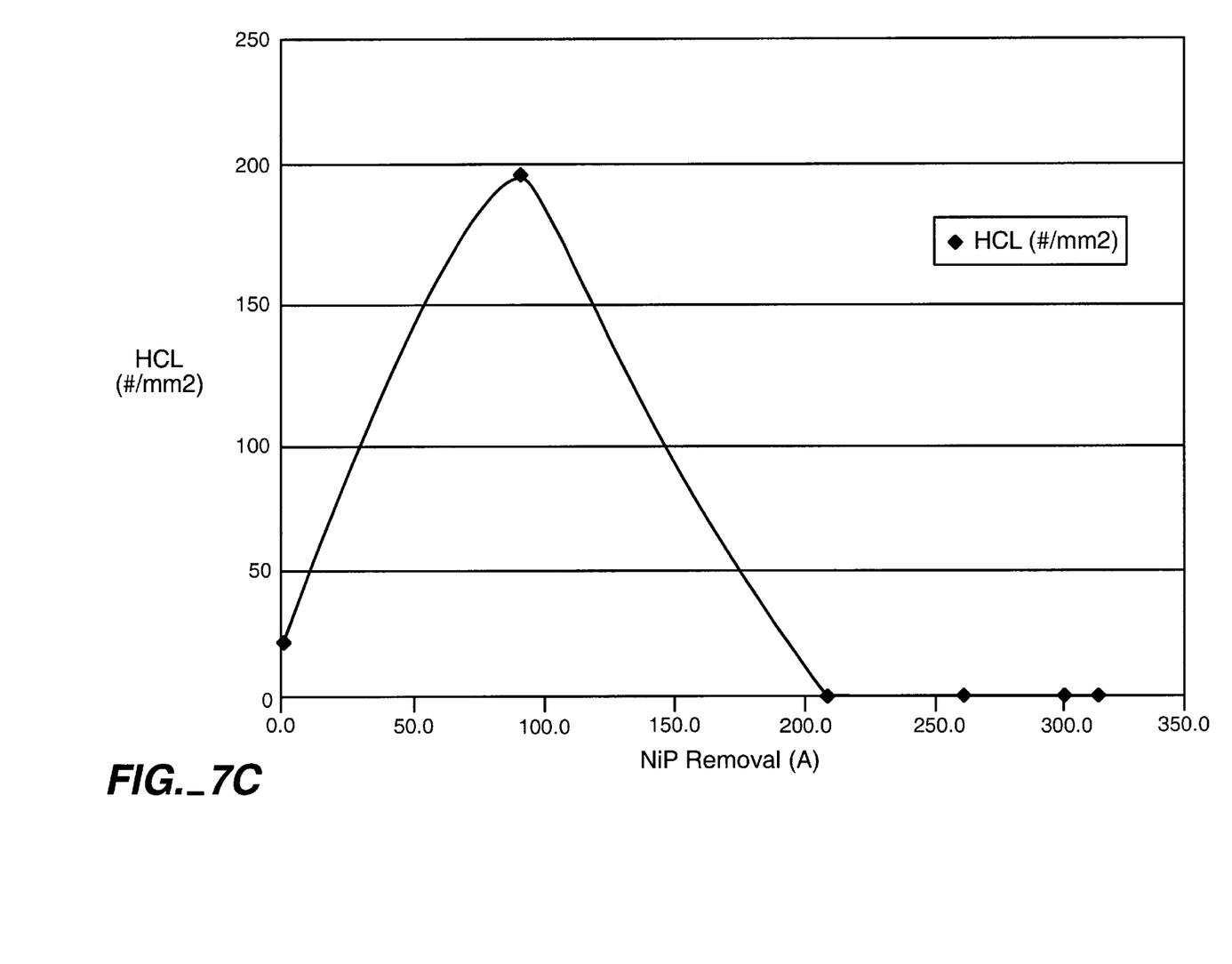

FIGS. 7A, 7B and 7C plot NiP removal, orientation ratio and corrosion site density for a set of disks processed in the same manner as those described in relation to Table 1, but with approximately 300 Å of NiP as deposited. Referring now to FIG. 7A, the amount of removal of NiP as a function of texture time is shown. NiP removal is determined by measuring weight loss after texturing and then converting to the thickness of the layer removed. As can be seen, after about 100 seconds of texturing, the removal of material levels off, indicating that once the NiP layer is substantially removed by the texture process, no or insignificant removal of the NiNb layer occurs due to the greater abrasion resistance of that layer.

FIG. 7B shows the orientation ratio of MrT as a function of NiP removal. Initially, with no texturing, the orientation ratio is close to one. As the extent of texturing is increased, the orientation ratio increases due to the formation of more and generally deeper grooves. However, as the extent of texturing continues to increase, and the lower layer is reached, the orientation ratio gradually decreases. This is due to the fact that as the lower layer is reached, insignificant texturing of that layer occurs while the remainder of the NiP layer begins to become abraded away, or smoothed out as discussed earlier.

Referring now to FIG. 7C, the number of corrosion sites as a function of the extent of texturing is shown. With no texturing, a significant number of corrosion sites are present. To understand this, brief reference is made to FIG. 9, which shows an untextured substrate surface, having a layer of NiNb and a layer of NiP deposited thereon. As can be seen, the untextured substrate surface has numerous spikes or high points, several of which are marked with reference numeral 901. These spikes originate on the glass substrate after it has been subjected to standard glass cleaning steps or due to other exposure to moisture. Without texturing, these high points remain until they are subsequently burnished off. Once burnished off, one or more layers, and particularly the protective overcoat, is removed in the region of the spike, exposing the underlying layers to moisture. The texturing process removes these spikes so that they are no longer present at the burnish step of the process.

Returning to FIG. 7C, initially, as some texturing is performed, the number of corrosion sites increases due to the formation of deep gouges through the thickness of the NiP layer, and due to the formation of high ridges. Eventually, as the texturing begins to contact the underlayer, ridges are warn down and the previously formed gouges are eliminated without further gouging due to the presence of the lower layer as described herein, resulting in reduced corrosion sites. The fact that the number of corrosion sites decreases with increasing texturing is further evidence that the NiNb layer of the present invention is very resistant to abrasion. It should be noted that in the prior art, the NiP layer is typically much thicker than the layers described herein, and there is no limit to the extent of gouging and ridge formation that can occur. Therefore, the number of defects that can be expected in the prior art will typically be near or even above the maximum shown on FIG. 7B, depending upon the orientation ratio desired. Stated alternatively, whereas a maxima in the number of defects occurs at about 90 Å removal in the present invention, without an underlayer, the number of defects can be expect to continue to climb (or at best eventually level off) without the hard underlayer of the present invention.

As shown in FIG. 7B, the orientation ratio reaches a maximum at about 175 Å of NiP removal. Generally, it is desirable to operate at about this point (to achieve maximum orientation ratio) if the amount of corrosion is acceptable. However, it may be desirable to operate to the right of this point if further corrosion prevention is needed and the coercivity and squareness at such point are sufficiently high. In this regard, it has been found that it is not generally necessary to have the highest orientation ratio achievable. While a higher orientation ratio generally results in higher coercivity and squareness, small gains in orientation ratio typically will not provide sufficiently improved magnetic performance to justify a significant reduction in corrosion prevention, so that a trade-off of slightly lower orientation ratio for reduced corrosion is acceptable. For example, As shown in FIG. 7C, the number of corrosion sites is reduced to zero at approximately 210 Å NiP removal. Returning to FIG. 7B, at 210 Å NiP removal, the orientation ratio is approximately 1.8, which will not result in significant degradation of magnetic performance from the peak value of approximately 1.95 at approximately 160 Å NiP removal. Thus, excellent magnetic performance is achieved with excellent corrosion resistance. It is generally not desirable to operate to the left of the orientation ratio maxima as the number of corrosion sites increases while the orientation ratio decreases. However, in some cases it may be desirable to operate somewhat to the left if desired for process time reduction (throughput increase) or other reasons if the coercivity and corrosion results are within acceptable limits.

It may also be desirable to operate at a greater degree of texturing if other improvements are utilized in, e.g., the crystallography or composition of the various underlayers or magnetic layers of the medium, such that the orientation ratio for such medium is greater than that shown in FIG. 7B for a given extent of texturing. In other words, media achieving high orientation ratio with small grooves will particularly benefit from the corrosion prevention offered by the present invention, as it can be textured to the extent needed for corrosion control while providing extremely high orientation ratios.

Figure 8A:
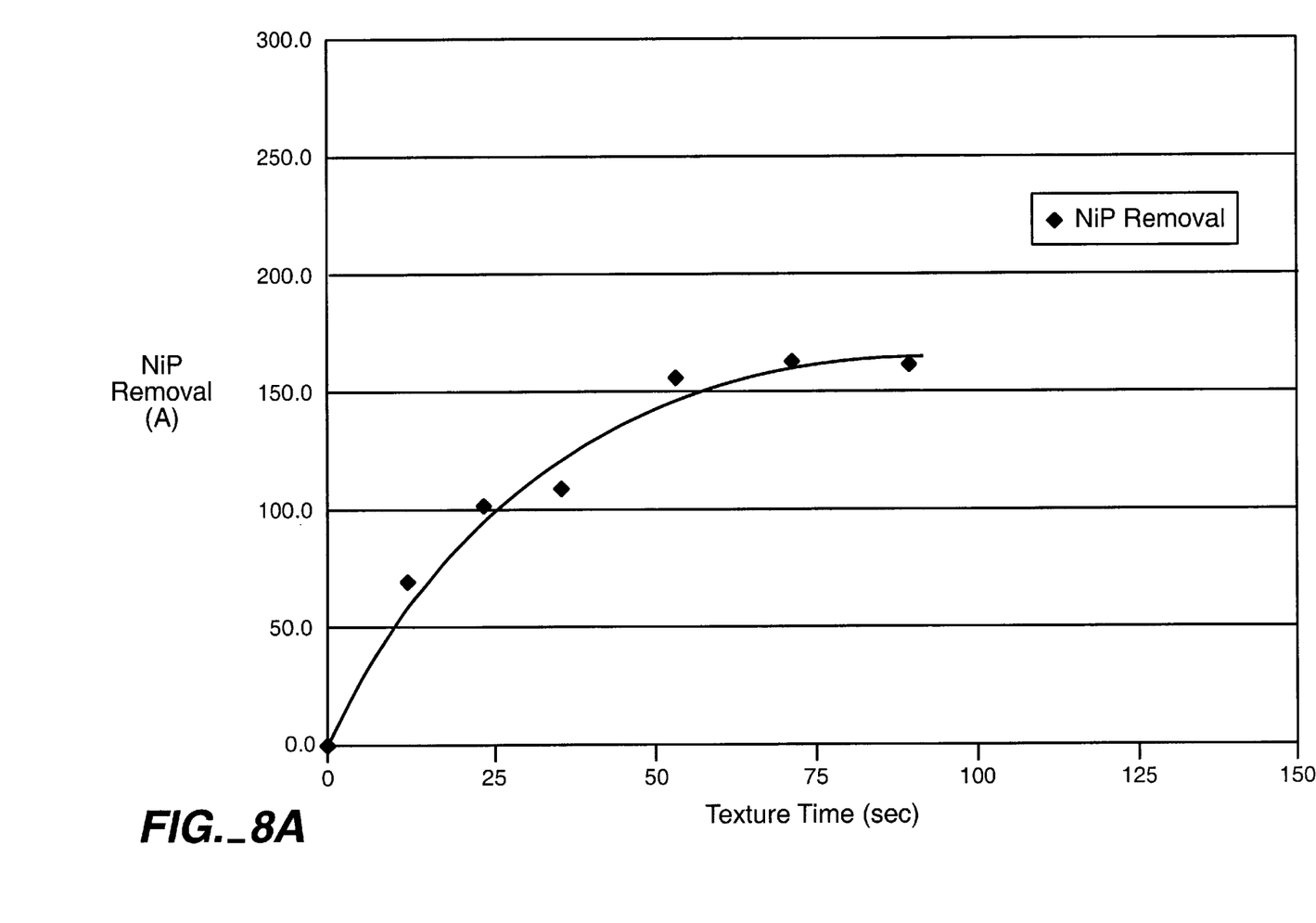
FIGS. 8A, 8B and 8C show NiP removal as a function of texture time, MrT orientation ratio as a function of NiP removal, and number of corrosion sites as a function of NiP removal, respectively, for a process according to an embodiment of the present invention, for a second initial NiP layer thickness.
Figure 8B:
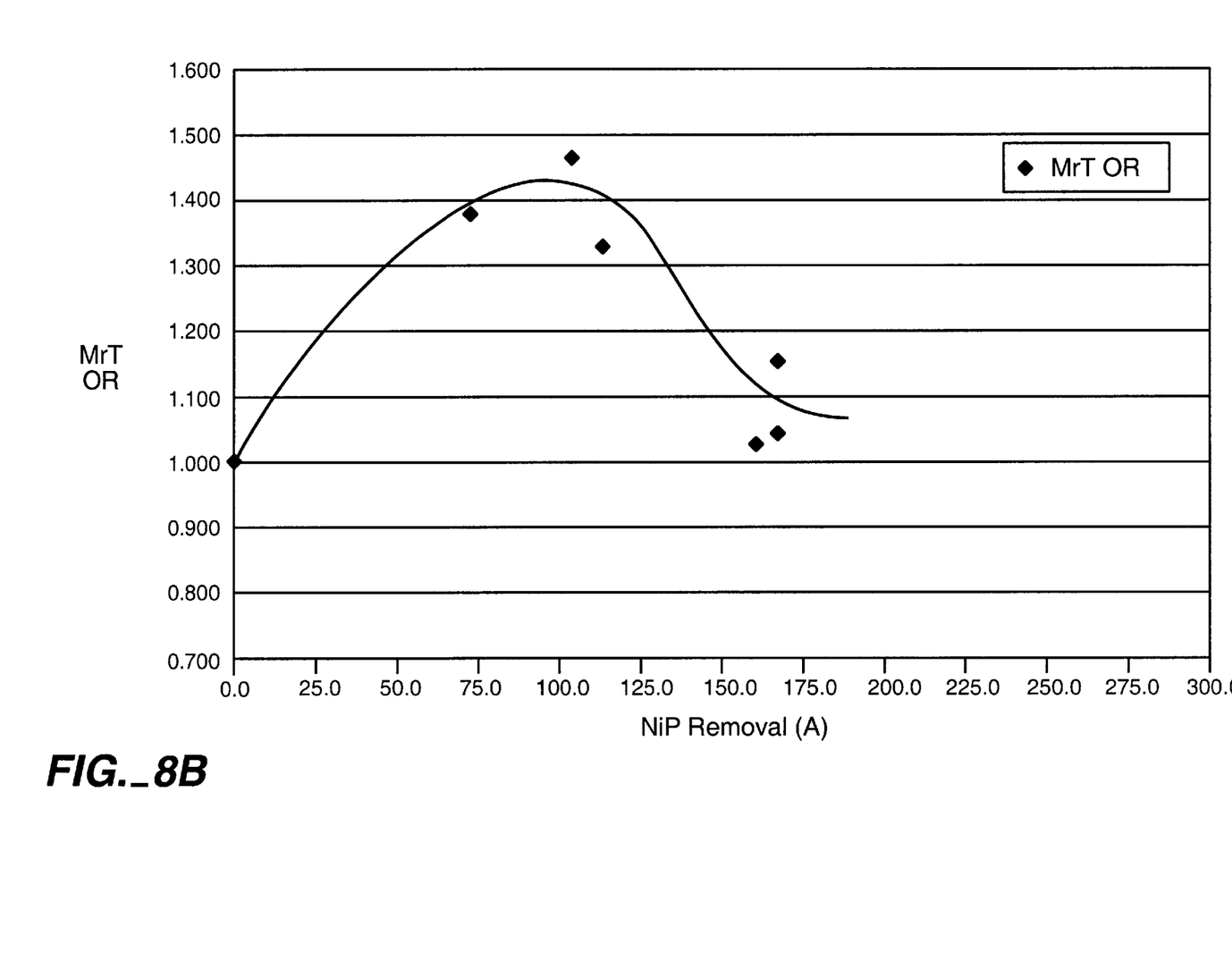
Figure 8C:
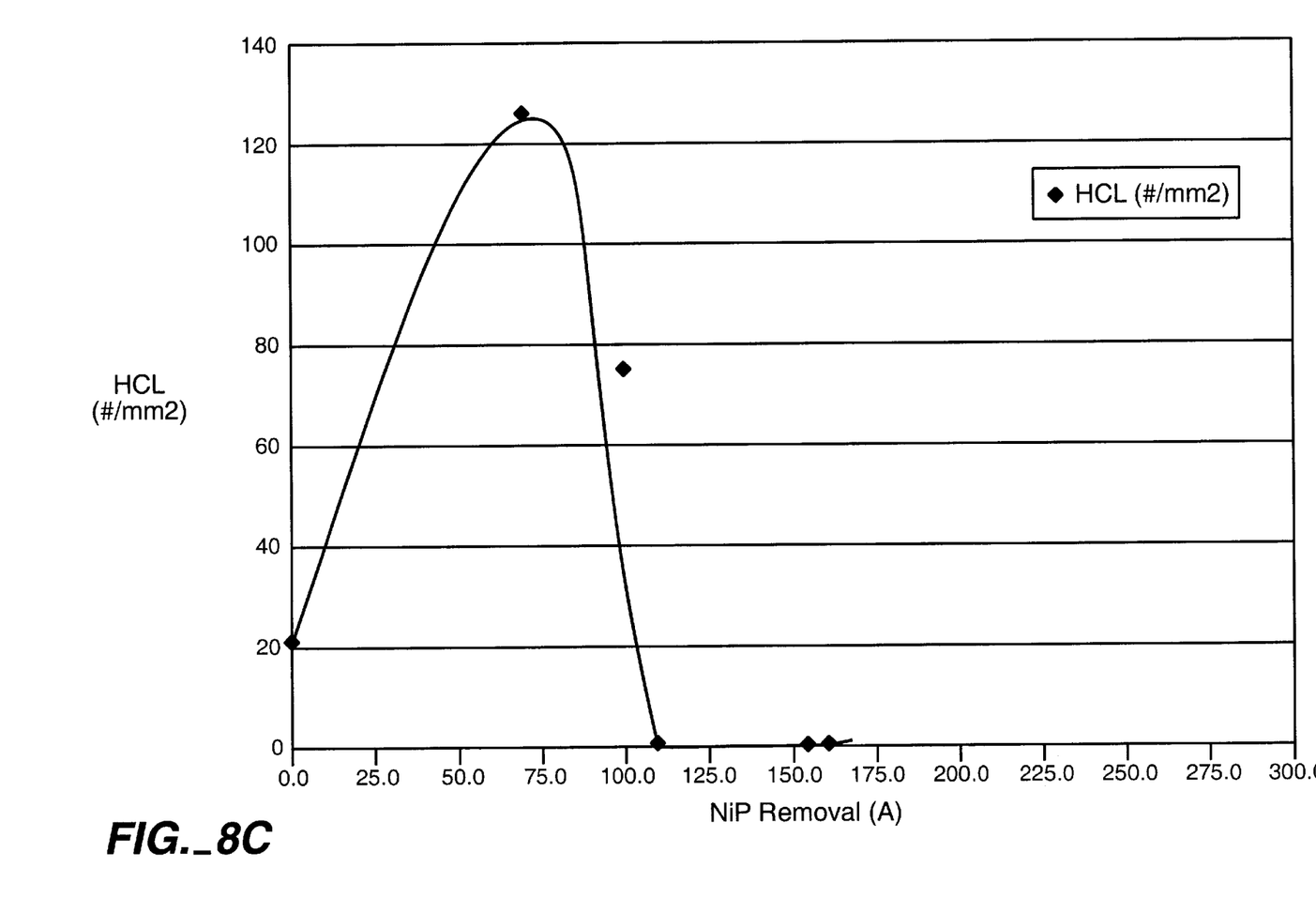

FIGS. 8A, 8B and 8C show NiP removal as a function of texture time, MrT orientation ratio as a function of NiP removal, and number of corrosion sites as a function of NiP removal, respectively, for the media described in relation to Table 1, having an as-deposited NiP layer thickness of approximately 200 Å. As can be seen, the results parallel those shown for the thicker NiP layer shown in FIGS. 7A–7C. Note that the maximum orientation ratio of the 200 Å film of FIGS. 8A–8C is not as great as that of the 300 Å film of FIGS. 7A–7C. This may be due to the fact that the 200 Å film may not provide sufficiently high grooves on average to achieve the same, high orientation ratio. However, the orientation ratio is still relatively high, and it has been found that the noise and thermal stability of the film of FIGS. 8A–8C is very good.

Although the present invention has particular advantage in media formed with downtrack grooves, the present invention has benefits in media with any type of texture (e.g. radial texture, random texture, or other) by providing for excellent tribological performance and low corrosion as described herein. These advantages are of particular importance as fly heights are reduced.

EXAMPLE

On a 3½ inch diameter magnetic media disk formed of amorphous glass, the lower layer is formed of nickel niobium and may be, for example, between about 25 angstroms and about 5,000 angstroms thick, more preferably in the range of about 100 angstroms to about 2000 angstroms thick, and most preferably in the range of approximately 500–1500 Å thick. In this specific example, the lower layer is about 1000 angstroms thick. As mentioned early, the thickness is preferably such that the layer provides sufficient thermal conductivity to mitigate the effects of baseline shift, but preferably no greater than this to retain a smooth surface, reduce costs and increase throughput. Moreover, a lower thickness results in lower internal stress of the layer.

Above the lower layer, the NiP layer may be, for example, in the range of about 25 angstroms to about 1000 angstroms thick, more preferably in the range of about 75 angstroms to about 300 angstroms thick, and most preferably in the range of approximately 100–200 Å thick. In this specific example, the NiP layer is about 150 angstroms thick. Other as-deposited thickness may be used depending upon the amount of material removed in the texture process used.

After downtrack texture grooves are formed in the NiP layer, a chromium layer (such as CrMo) is disposed above the NiP layer. This chromium layer may be between about 50 angstroms and about 500 angstroms thick, and more preferably between about 100 angstroms and about 200 angstroms thick. In this specific example, the chromium layer is about 150 angstroms thick.

A magnetic layer containing a cobalt alloy is disposed above the chromium layer. This cobalt alloy layer may be between about 50 angstroms and about 300 angstroms thick, and more preferably about 100 angstroms and about 200 angstroms thick. In this specific example, the cobalt alloy layer is about 150 angstroms thick.

It will be appreciated that different thickness of the layers, materials and other layers may be used in addition to or instead of those described above.

Industrial Application

The inventive magnetic disk disclosed herein may be employed in magnetic disk drives. In one exemplary implementation, one or more of the inventive magnetic disks may be mounted on a spindle, which is rotated by a motor at speeds of several thousands of RPM (e.g., 10,000 RPM or more). One or more read-write heads may be mounted on arms, which are actuated to move the read-write heads to specific positions on a given inventive magnetic disk to perform reading and/or writing of data to the inventive magnetic disk. The components and operation of these magnetic disk drives are conventional (other than the inventive magnetic disks therein). Additional information of some exemplary magnetic disk drives may be obtained by reviewing U.S. Pat. No. 4,949,202 (Kim); U.S. Pat. No. 5,025,335 (Stefansky); U.S. Pat. No. 5,027,241 (Hatch), all of which are incorporated herein by reference.

While this invention has been described in terms of several preferred embodiments, there are alterations, permutations, and equivalents that fall within the scope of this invention. Individual aspects of any described embodiment may be used in any other embodiment. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for forming a magnetic disk for data storage, comprising:

providing a substrate;

forming a first layer above said substrate, said first layer having a first degree of abrasion resistance, said first layer being substantially amorphous;

forming a second layer above said first layer, said second layer having a second degree of abrasion resistance lower than said first degree of abrasion resistance; and forming grooves in said second layer.

2. The method of claim 1 wherein said first layer comprises nickel niobium.

3. The method of claim 2 wherein said substrate comprises glass.

4. The method of claim 3 wherein said substrate comprises glass ceramic.

5. The method of claim 1 further comprising forming one or more layers above said substrate selected from the group consisting of: a chromium containing underlayer, a magnetic layer and a protective overcoat layer.

6. The method of claim 1 wherein said second layer comprises NiP.

7. A magnetic disk for data storage, comprising:

a substrate;

a first layer disposed above said substrate, said first layer having a first degree of abrasion resistance, said first layer being substantially amorphous; and a second layer disposed above said first layer, said second layer having a second degree of abrasion resistance, said first degree of abrasion resistance being higher than said second degree of abrasion resistance, said second layer having grooves thereon.

8. The magnetic disk of claim 7 wherein said first layer comprises nickel niobium.

9. The magnetic disk of claim 7 wherein said substrate comprises glass.

10. A magnetic disk drive for storing data, comprising:

a magnetic disk including a substrate, said magnetic disk comprising a first layer disposed above said substrate, said first layer having a first degree of abrasion resistance, said first layer being substantially amorphous, and a second layer disposed above said first layer, said second layer having a second degree of abrasion resistance, said first degree of abrasion resistance being higher than said second degree of abrasion resistance, said second layer having grooves thereon, and a magnetic layer disposed above said second layer;

a motor coupled to said magnetic disk for rotating said magnetic disk;

a read-write head configured to be disposed for reading data from and writing data to said magnetic disk;

an arm for holding said read-write head; and an actuator for moving said arm so that said read-write head may be placed over desired positions on said magnetic disk.

11. The magnetic disk drive of claim 10 wherein said first layer comprises nickel niobium.

12. A method for forming a magnetic disk for data storage, comprising:

providing a substrate;

forming a first layer above said substrate, said first layer having a first degree of abrasion resistance, said first layer comprising niobium;

forming a second layer above said first layer, said second layer having a second degree of abrasion resistance lower than said first degree of abrasion resistance; and forming grooves in said second layer.

13. The method of claim 12 wherein said first layer comprises nickel niobium.

14. The method of claim 13 wherein said substrate comprises glass.

15. The method of claim 14 wherein said substrate comprises glass ceramic.

16. The method of claim 12 further comprising forming one or more layers above said substrate selected from the group consisting of: a chromium containing underlayer, a magnetic layer and a protective overcoat layer.

17. The method of claim 12 wherein said second layer comprises NiP.

18. A magnetic disk for data storage, comprising:

a substrate;

a first layer disposed above said substrate, said first layer having a first degree of abrasion resistance, said first layer comprising niobium; and a second layer disposed above said first layer, said second layer having a second degree of abrasion resistance, said first degree of abrasion resistance being higher than said second degree of abrasion resistance, said second layer having grooves thereon.

19. The magnetic disk of claim 18 wherein said second layer comprises NiP.

20. A magnetic disk drive for storing data, comprising:

a magnetic disk including a substrate, said magnetic disk comprising a first layer disposed above said substrate, said first layer having a first degree of abrasion resistance, said first layer comprising niobium, and a second layer disposed above said first layer, said second layer having a second degree of abrasion resistance, said first degree of abrasion resistance being higher than said second degree of abrasion resistance, said second layer having grooves thereon, and a magnetic layer disposed above said second layer;

a motor coupled to said magnetic disk for rotating said magnetic disk;

a read-write head configured to be disposed for reading data from and writing data to said magnetic disk;

an arm for holding said read-write head; and an actuator for moving said arm so that said read-write head may be placed over desired positions on said magnetic disk.

21. The magnetic disk drive of claim 20 wherein said first layer comprises nickel niobium.

22. A method for forming a magnetic disk for data storage, comprising:

providing a substrate;

forming a first layer above said substrate, said first layer having a first degree of abrasion resistance;

forming a second layer above said first layer, said second layer having a second degree of abrasion resistance lower than said first degree of abrasion resistance, said second layer comprising nickel; and forming grooves in said second layer.

23. The method of claim 22 wherein said second layer comprises NiP.

24. The method of claim 22 wherein said substrate comprises glass.

25. The method of claim 24 wherein said substrate comprises glass ceramic.

26. The method of claim 22 further comprising forming one or more layers selected from the group consisting of: a chromium containing underlayer, a magnetic layer and a protective overcoat layer.

27. A magnetic disk for data storage, comprising:

a substrate;

a first layer disposed above said substrate, said first layer having a first degree of abrasion resistance; and a second layer disposed above said first layer, said second layer having a second degree of abrasion resistance, said second layer comprising nickel, said first degree of abrasion resistance being higher than said second degree of abrasion resistance, said second layer having grooves thereon.

28. The magnetic disk of claim 27 wherein said second layer comprises NiP.

29. The magnetic disk of claim 27 wherein said substrate comprises glass.

30. A magnetic disk drive for storing data, comprising:

a magnetic disk including a substrate, said magnetic disk comprising a first layer disposed above said substrate, said first layer having a first degree of abrasion resistance, and a second layer disposed above said first layer, said second layer having a second degree of abrasion resistance, said second layer comprising nickel, said first degree of abrasion resistance being higher than said second degree of abrasion resistance, said second layer having grooves thereon, and a magnetic layer disposed above said second layer;

a motor coupled to said magnetic disk for rotating said magnetic disk;

a read-write head configured to be disposed for reading data from and writing data to said magnetic disk;

an arm for holding said read-write head; and an actuator for moving said arm so that said read-write head may be placed over desired positions on said magnetic disk.

31. The magnetic disk drive of claim 30 wherein said second layer comprises NiP.

32. A method for forming a magnetic disk for data storage, comprising:

providing a substrate;

forming a first layer above said substrate, said first layer having a first degree of abrasion resistance;

forming a second layer above said first layer, said second layer having a second degree of abrasion resistance lower than said first degree of abrasion resistance, wherein a surface of said second layer has an Ra roughness of 50 Å or less following formation thereof; and forming grooves in said second layer.

33. The method of claim 32 wherein said substrate comprises glass.

34. The method of claim 32 wherein said Ra roughness is 25 Å or less.

35. The method of claim 32 wherein said Ra roughness is 10 Å or less.

36. A magnetic disk for data storage, comprising:

a substate;

a first layer disposed above said substrate, said first layer having a first degree of abrasion resistance; and a second layer disposed above said first layer, said second layer having a second degree of abrasion resistance, said first degree of abrasion resistance being higher than said second degree of abrasion resistance, wherein said second layer has an Ra roughness of 50 Å or less following formation thereof, said second layer having grooves thereon.

37. A magnetic disk drive for storing data, comprising:

a magnetic disk including a substrate, said magnetic disk comprising a first layer disposed above said substrate, said first layer having a first degree of abrasion resistance, and a second layer disposed above said first layer, said second layer having a second degree of abrasion resistance, wherein said second layer has an Ra roughness of 50 Å or less following formation thereof, said first degree of abrasion resistance being higher than said second degree of abrasion resistance, said second layer having grooves thereon, and a magnetic layer disposed above said second layer;

a motor coupled to said magnetic disk for rotating said magnetic disk;

a read-write head configured to be disposed for reading data from and writing data to said magnetic disk;

an arm for holding said read-write head; and an actuator for moving said arm so that said read-write head may be placed over desired positions on said magnetic disk.

38. A method for forming a magnetic disk for data storage, comprising:

providing a substrate;

forming a first layer above said substrate, said first layer having a first degree of abrasion resistance;

forming a second layer above said first layer, said second layer having a second degree of abrasion resistance lower than said first degree of abrasion resistance, said second layer formed to a thickness of approximately 500 Å or less; and forming grooves in said second layer.

39. The method of claim 38 wherein said first layer is a layer comprising nickel niobium.

40. The method of claim 38 wherein said substrate comprises glass.

41. The method of claim 38 wherein said second layer comprises NiP.

42. A magnetic disk for data storage, comprising:

a substrate;

a first layer disposed above said substrate, said first layer having a first degree of abrasion resistance; and a second layer disposed above said first layer, said second layer having a second degree of abrasion resistance, said first degree of abrasion resistance being higher than said second degree of abrasion resistance, said second layer having a thickness of approximately 500 Å or less, said second layer having grooves thereon.

43. The magnetic disk of claim 42 wherein said first layer comprises nickel niobium.

44. The magnetic disk of claim 42 wherein said substrate comprises glass.

45. A magnetic disk drive for storing data, comprising:

a magnetic disk including a substrate, said magnetic disk comprising a first layer disposed above said substrate, said first layer having a first degree of abrasion resistance, and a second layer disposed above said first layer, said second layer having a second degree of abrasion resistance, said second layer having a thickness of approximately 500 Å or less, said first degree of abrasion resistance being higher than said second degree of abrasion resistance, said second layer having grooves thereon, and a magnetic layer disposed above said second layer;

a motor coupled to said magnetic disk for rotating said magnetic disk;

a read-write head configured to be disposed for reading data from and writing data to said magnetic disk;

an arm for holding said read-write head; and an actuator for moving said arm so that said read-write head may be placed over desired positions on said magnetic disk.

46. The magnetic disk drive of claim 45 wherein said first layer comprises nickel niobium.

* * * * *